United States Patent
Aoyama

(10) Patent No.: US 11,122,228 B2
(45) Date of Patent: Sep. 14, 2021

(54) IMAGING APPARATUS, METHOD FOR CONTROLLING THE SAME, AND STORAGE MEDIUM

(71) Applicant: CANON KABUSHIKI KAISHA, Tokyo (JP)

(72) Inventor: Yuuzou Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/742,664

(22) Filed: Jan. 14, 2020

(65) Prior Publication Data
US 2020/0236314 A1 Jul. 23, 2020

(30) Foreign Application Priority Data
Jan. 23, 2019 (JP) .............................. JP2019-009316

(51) Int. Cl.
*H04N 5/369* (2011.01)
*H04N 5/378* (2011.01)

(52) U.S. Cl.
CPC ........... *H04N 5/3698* (2013.01); *H04N 5/378* (2013.01)

(58) Field of Classification Search
CPC ...... H04N 5/3698; H04N 5/378; H04N 5/379; H04N 5/343; H04N 5/374; H04N 5/3765
See application file for complete search history.

(56) References Cited

U.S. PATENT DOCUMENTS

| | | | | |
|---|---|---|---|---|
| 2010/0177214 A1* | 7/2010 | Ozaki | ................ | H04N 5/23245 348/234 |
| 2011/0298962 A1* | 12/2011 | Shiohara | ............ | H04N 5/23235 348/333.02 |
| 2014/0085512 A1* | 3/2014 | Ikeda | ................. | H04N 5/23296 348/240.2 |

FOREIGN PATENT DOCUMENTS

JP 2017-034344 A 2/2017

* cited by examiner

*Primary Examiner* — Yogesh K Aggarwal
(74) *Attorney, Agent, or Firm* — Canon U.S.A., Inc., I.P. Division

(57) ABSTRACT

An imaging apparatus includes an image sensor and a controller. The image sensor has a plurality of pixels and simultaneously reads out a first image signal acquired by a first pixel group among the plurality of pixels and a second image signal acquired by a second pixel group among the plurality of pixels. The controller performs operations including controlling. A vertical synchronization signal is controlled to synchronize the vertical synchronization signal with a readout cycle of an image signal corresponding to a high frame rate when the first image signal and the second image signal are simultaneously read out from the image sensor. Where low power consumption control regarding the image sensor is performed, the vertical synchronization signal is controlled to increase a period during which the image sensor is kept in a low power consumption state when only the first image signal is read out from the image sensor.

8 Claims, 9 Drawing Sheets

IMAGING APPARATUS, METHOD FOR CONTROLLING THE SAME, AND STORAGE MEDIUM

BACKGROUND

Field

The present disclosure relates to an imaging apparatus, a method for controlling an imaging apparatus, and a storage medium.

Description of the Related Art

Recent imaging apparatuses have been becoming able to raise an added value of an imaging function together with capturing a video image at a high resolution by employing a technique of simultaneously reading out a plurality of image signals from an image sensor via different signal channels. For example, Japanese Patent Application Laid-Open No, 2017-34344 discusses the following technique, According to the technique proposed therein, a first image signal is acquired from a first pixel group among pixels forming an image sensor, and a second image signal is acquired from a second pixel group at a higher frame rate than that of the first image signal. The acquired first image signal is used for a video display, and second image signal is used for automatic focus control. Further, the first image signal and the second image signal are combined to be used for a video display at the time of an in-focus adjustment, and thereby smooth and accurate in-focus confirmation is achieved.

SUMMARY

According to an aspect of the present disclosure, an imaging apparatus includes an image sensor including a plurality of pixels and configured to simultaneously read out a first image signal acquired by a first pixel group among the plurality of pixels and a second image signal acquired by a second pixel group among the plurality of pixels, and a controller having a processor to execute instructions stored in a memory to perform operations including controlling a vertical synchronization signal to synchronize the vertical synchronization signal with a readout cycle of an image signal corresponding to a high frame rate when the first image signal and the second image signal are simultaneously read out from the image sensor, and controlling, in a case where low power consumption control regarding the image sensor is performed, the vertical synchronization signal to increase a period during which the image sensor is kept in a low power consumption state when only the first image signal is read out from the image sensor.

Further features of the present disclosure will become apparent from the following description of exemplary embodiments with reference to the attached drawings.

DESCRIPTION OF THE EMBODIMENTS

In the following description, an exemplary embodiment of the present disclosure will be described with reference to the drawings.

Figure 1:
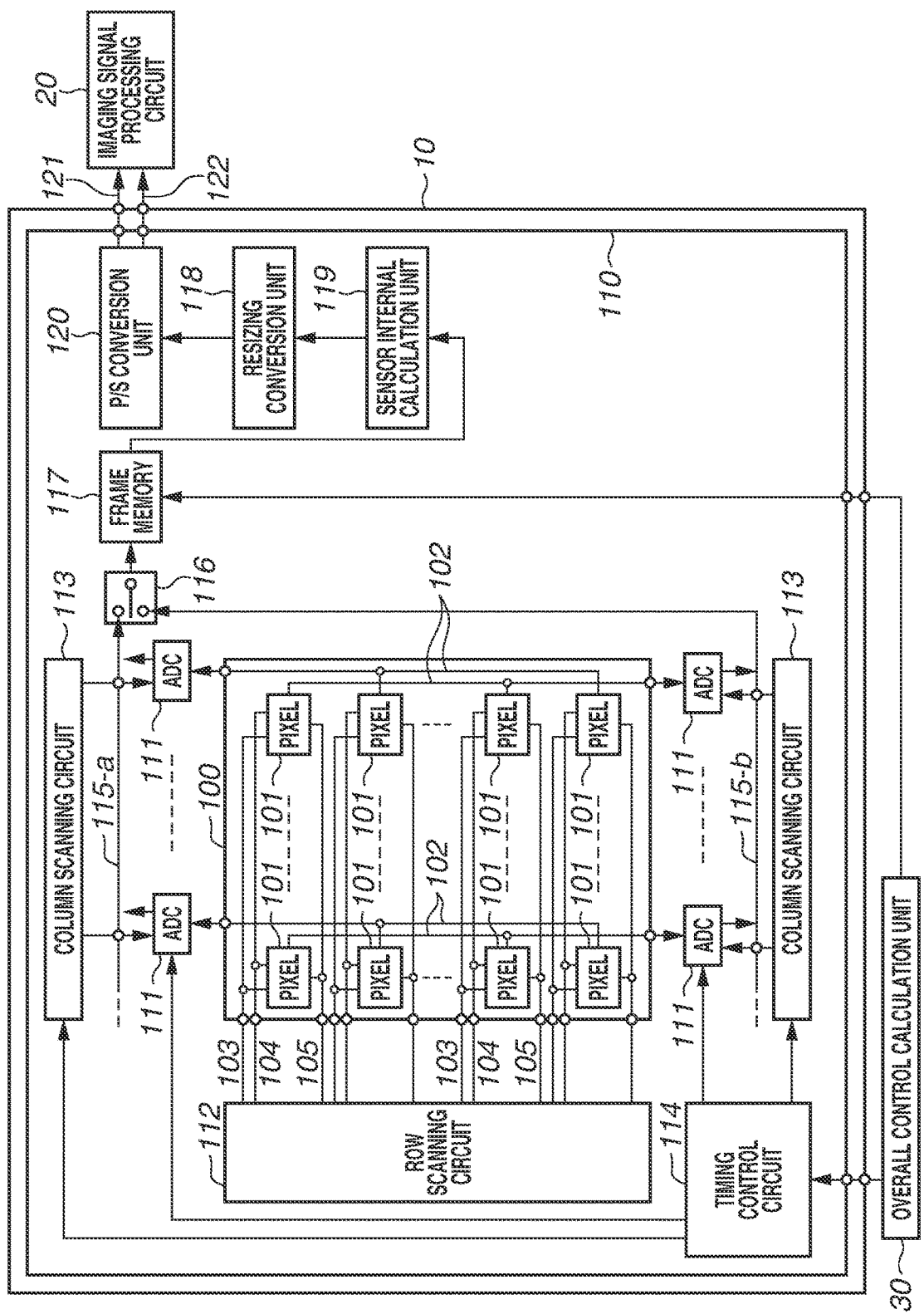
FIG. 1 illustrates a block diagram of a configuration example of an image sensor according to an exemplary embodiment.

FIG. 1 is a block diagram illustrating an example of a schematic configuration of an image sensor 10 according to an exemplary embodiment of the present disclosure. The image sensor 10 is controlled by an overall control calculation unit 30, and outputs an image signal acquired through image capturing to an imaging signal processing circuit 20. The image sensor 10 includes pixel units 101, vertical output lines 102, transfer signal lines 103, reset signal lines 104, row selection signal lines 105, column analog-digital converter units (column ADC units) 111, a row scanning circuit 112, and column scanning circuits 113. The image sensor 10 further includes a timing control circuit 114, horizontal signal lines 115-a and 115-b, a selector switch 116, a frame memory 117, a resizing conversion unit 118, a sensor internal calculation unit 119, and a parallel-serial conversion unit (P/S conversion unit) 120.

Figure 2A:
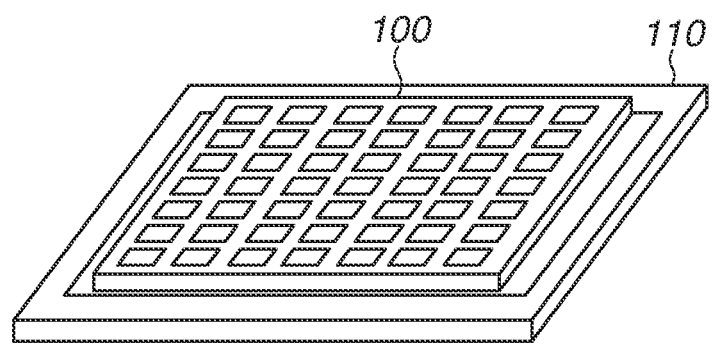
FIGS. 2A and 2B illustrate outer views of the image sensor according to the exemplary embodiment.
Figure 2B:
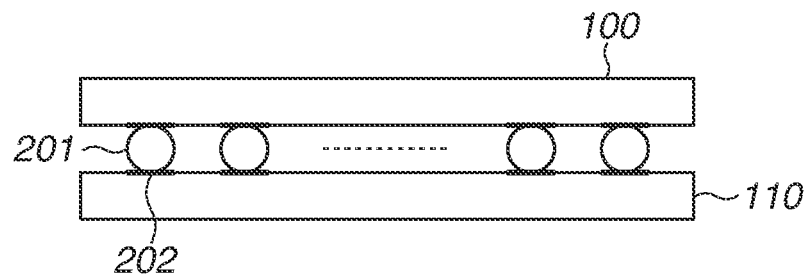

The image sensor 10 is formed, for example, by a first chip 100 and a second chip 110 as indicated by an example illustrated in FIGS. 2A and 2B. The first chip 100 is stacked on the second chip 110. FIG. 2A illustrates the image sensor 10 as viewed from obliquely above one side on which light is incident. FIG. 2B is a cross-sectional view of the image sensor 10. For example, the plurality of pixel units 101 is arrayed in a matrix manner (two-dimensionally), and is formed on the first chip (an imaging layer) 100 disposed on the light incident side. In other words, the pixel units 101 are positioned on one side where light of an optical image is received. Pixel driving circuits, such as the column ADCs 111, the row scanning circuit 112, the column scanning circuits 113, and the timing control circuit 114, are formed on the second chip (a circuit layer) 110, Further, for example, the frame memory 117, the resizing conversion unit 118, the sensor internal calculation unit 119, and the P/S conversion unit 120 are formed on the second chip (the circuit layer) 110. The first chip 100 and the second chip 110 are electrically connected to each other via micro-bumps 201 and micro-pads 202 formed on the chips 100 and 110. Thus, a manufacturing process of the imaging layer and the circuit layer of the image sensor 10 can be separated, by forming the pixel units 101 on the first chip 100, and by forming the circuits including the pixel driving circuits, the memory circuit, and the calculation circuit on the second chip 110. Therefore, an increase in the speed, a reduction in the size, and provision of advanced functionality can be achieved by allowing the wiring on the circuit layer to reduce in width and be laid out at a high density.

The pixel units 101 are arrayed in the matrix manner, and photoelectrically convert the incident light into electric signals and output them. The pixel units 101 are connected to the transfer signal lines 103, the reset signal lines 104, and the row selection signal lines 105 in a horizontal direction (e.g., a row direction). The pixel units 101 are connected to the vertical output lines 102 in a vertical direction (e.g., a column direction). Each of the vertical output lines 102 is connected to a different connection destination row by row according to the read unit of row.

The column ADC units 111 are connected to the vertical output lines 102, and convert analog voltage signals input via the vertical output lines 102 into digital signals, The row scanning circuit 112 scans each of the rows. The column scanning circuits 113 scan each of the columns. The timing control circuit 114 controls operation timings of the row scanning circuit 112, the column scanning circuits 113, and the column ADC units 111, under the control by the overall control calculation unit 30. The horizontal signal lines 115-*a* and 115-*b* supply output signals (the image signals) output from the column ADC units 111 to the selector switch 116 at timings respectively controlled by the column scanning circuits 113.

The selector switch 116 is configured to selectively output the image signal supplied through the horizontal signal line 115-*a* or 115-*b* of each signal channel to the frame memory 117 sequentially. The frame memory 117 temporarily stores, as image data, the image signal output from the selector switch 116. The sensor internal calculation unit 119 calculates resizing and a compression depending on a driving mode. The resizing conversion unit 118 resines the image data stored in the frame memory 117 into a required angle of view based on a result calculated by the sensor internal calculation unit 119.

The image data resited by the resizing conversion unit 118 is subjected to the parallel-serial conversion by the P/S conversion unit 120, and is transmitted to the imaging signal processing circuit 20 outside the image sensor 10. The image sensor 10 and the imaging signal processing circuit 20 are connected to each other via a plurality of lanes. In the present exemplary embodiment, signals of different pixels or signals of the same pixel are transmitted from the image sensor 10 to the imaging signal processing circuit 20, while being sorted to a first lane 121 and a second lane 122 or using only the first lane 121 depending on the driving mode. When the processing such as the resizing or the compression is unnecessary, the image signal is directly transferred from the selector switch 116 to the P/S conversion unit 120.

Figure 3:
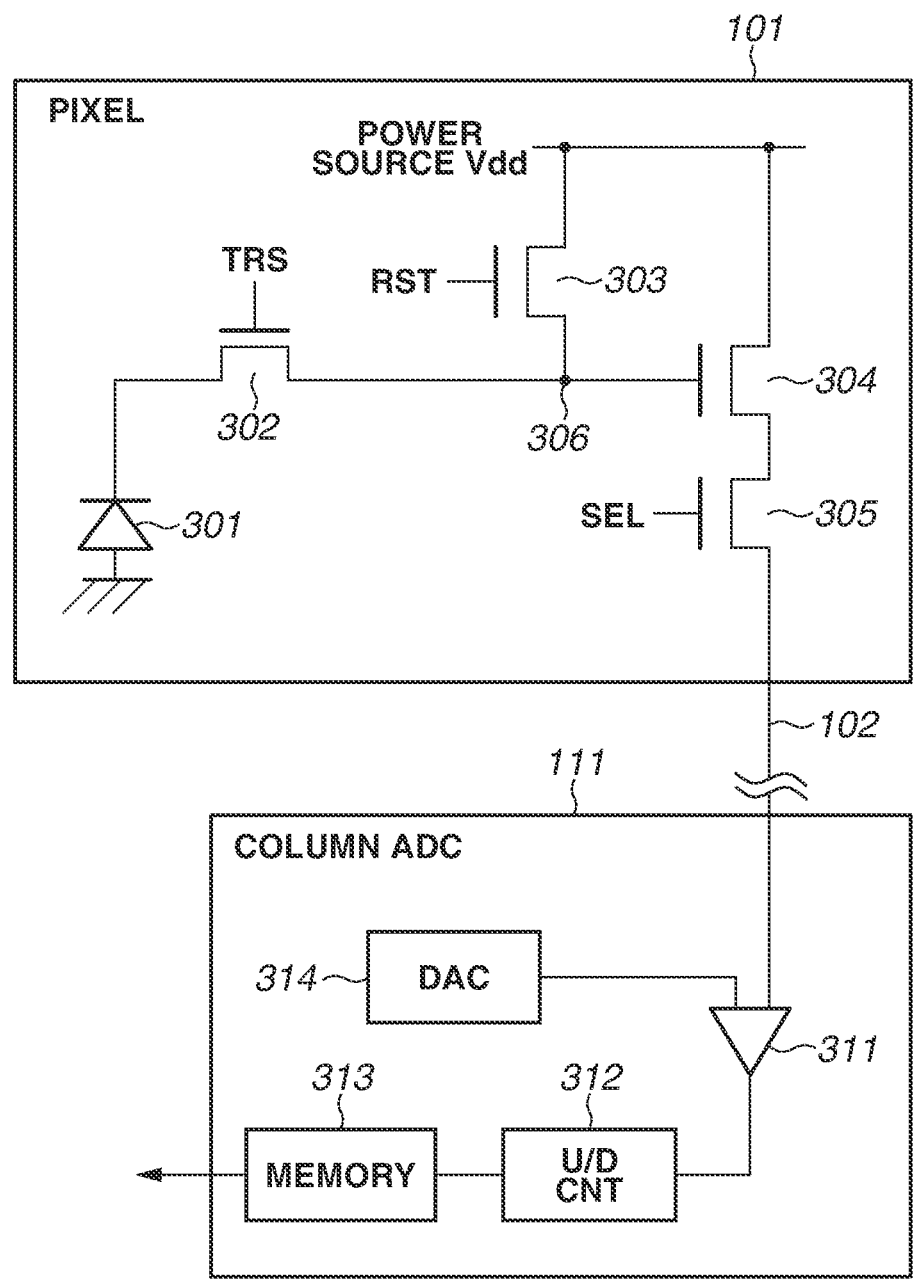
FIG. 3 illustrates an example of a pixel unit and a column analog-digital converter (ADC) unit according to the exemplary embodiment.

FIG. 3 illustrates an example of the pixel unit 101 and the column ADC unit 111 included in the image sensor 10 according to the present exemplary embodiment. As illustrated in FIG. 3, the pixel unit 101 includes a photodiode 301, a transfer transistor 302, a reset transistor 303, an amplification transistor 304, a selection transistor 305, and a floating diffusion (FD unit) 306. The column ADC unit 111 includes a comparator 311, an up/down counter 312, a memory 313, and a digital-analog converter (DAC) 314, In FIG. 3, for example, a negative (N) channel-type metal-oxide semiconductor (MOS) transistor is used as each of the transistors 302 to 305. However, the transistors 302 to 305 are not limited thereto.

The photodiode 301 photoelectrically converts the received light into a light charge (electrons in this example) corresponding to a charge amount according to a light amount of the received light. An anode of the photodiode 301 is grounded. A cathode of the photodiode 301 is electrically connected to a gate of the amplification ansistor 304 via the transfer transistor 302. A node electrically connected to the gate of this amplification transistor 304 forms the FD unit 306.

The transfer transistor 302 is connected between the cathode of the photodiode 301 and the FD unit 306. The transfer transistor 302 is brought into an ON state by being provided with a transfer pulse TRS to a gate thereof via the transfer signal line 103 (not-illustrated), and transfers the light charge photoelectrically converted at the photodiode 301 to the FD unit 306.

A drain and a source of the reset transistor 303 are connected to a pixel power source Vdd and the FD unit 306, respectively. The reset transistor 303 is brought into an ON state by being provided with a reset pulse RST to a gate thereof via the reset signal line 104 (not-illustrated). Accordingly, a potential in the FD unit 306 is reset to the pixel power source Vdd by discarding the charge stored in the FD unit 306 to the pixel power source Vdd prior to the transfer of the signal charge from the photodiode 301 to the FD unit 306.

The gate and a drain of the amplification transistor 304 are connected to the FD unit 306 and the pixel power source Vdd, respectively. The amplification transistor 304 converts the charge accumulated in the FD unit 306 into a voltage signal. The amplification transistor 304 outputs, as a reset level, the potential in the FD unit 306 that occurred after the FD unit 306 is reset by the reset transistor 303. The amplification transistor 304 outputs, as a signal level, the potential in the FD unit 306 that occurred after the signal charge is transferred by the transfer transistor 302.

A drain and a source of the selection transistor 305 are connected to, for example, a source of the amplification transistor 304 and the vertical output line 102, respectively. The selection transistor 305 is brought into an ON state by being provided with a selection pulse SEL to a gate thereof via the row selection signal line 105 (not-illustrated). Consequently, the pixel unit 101 is set into a selected state, and the signal output from the amplification transistor 304 is supplied to the vertical output line 102. The image signal output from the pixel unit 101 via the vertical output line 102 is transmitted to the column ADC unit 111.

The pixel unit 101 may be configured in such a manner that the selection transistor 305 is connected between the pixel power source Vdd and the drain of the amplification transistor 304. The pixel unit 101 is not limited to the pixel unit having the four-transistor configuration illustrated in FIG. 3. The pixel unit 101 may be, for example, a pixel unit having a three-transistor configuration in which one transistor doubles as the amplification transistor 304 and the selection transistor 305.

The vertical output line 102 and the DAC 314 are connected to one and the other of a pair of input terminals of the comparator 311, respectively. The DAC 314 outputs a ramp signal having a level changing in a ramp manner based on a reference signal input from the timing control circuit 114. The ramp signal is a signal having a level changing in one direction (one of an increase or a decrease) as time passes since a start of the output. The timing control circuit 114 outputs the reference signal to the DAC 314 based on an instruction from the overall control calculation unit 30.

The comparator 311 compares the level of the ramp signal output from the DAC 314 and the level of the image signal input from the vertical output line 102. For example, the comparator 311 outputs a comparison signal having a high level when the level of the image signal is lower than the level of the ramp signal, and outputs a comparison signal having a low level when the level of the image signal is higher than the level of the ramp signal.

The up/down counter 312 is connected to the comparator 311. The up/down counter 312 counts, for example, a period during which the comparison signal has the high level or a period during which the comparison signal has the low level. Due to this counting processing, the output signal (analog image signal) of each of the pixel units 101 is converted to digital values. The pixel unit 101 may be configured to include an AND circuit between the comparator 311 and the up/down counter 312 and input pulse signals to the AND circuit, and to cause the up/down counter 312 to count the number of the pulse signals output from the AND circuit.

The memory 313 is connected to the up/down counter 312, and stores therein the count value counted by the up/down counter 312. The column ADC unit 111 may count the count value corresponding to a reset level based on the image signal when the pixel unit 101 is reset and further count the count value based on the image signal after a predetermined imaging time, and then store a difference value these count values into the memory 313. Thereafter, the image signal stored in the memory 313 is transmitted to the horizontal signal line 115-a or 115-b in synchronization with the signal supplied from the column scanning circuit 113.

Figure 4:
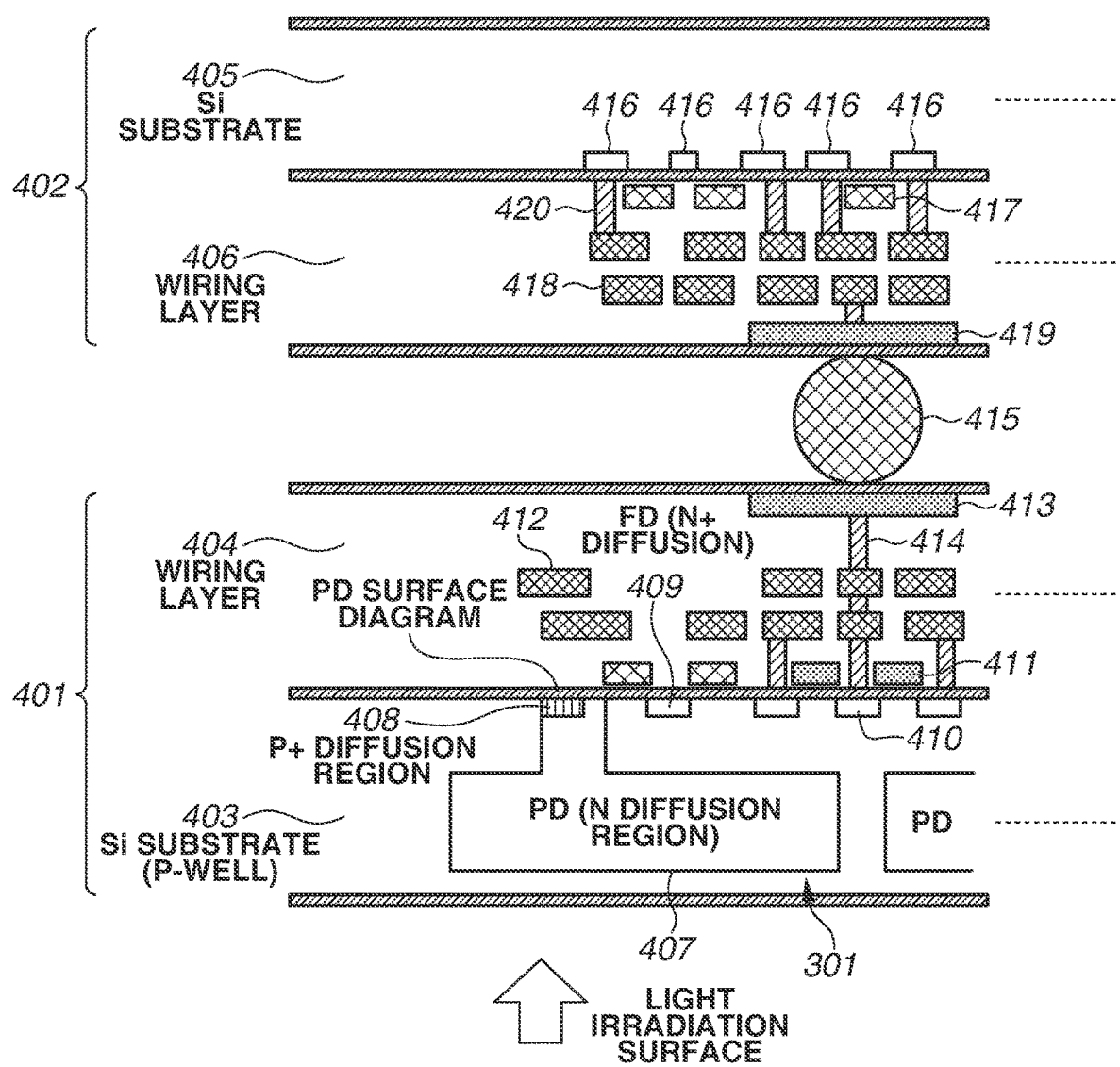
FIG. 4 illustrating a cross-sectional view of a configuration example of the image sensor according to the exemplary embodiment.

FIG. 4 illustrates an example of a cross-sectional configuration of the image sensor 10 according to the present exemplary embodiment illustrated in FIGS. 1 to 3. The example illustrated in FIG. 4 includes an imaging layer 401 and a circuit layer 402. The imaging layer 401 and the circuit layer 402 correspond to the first chip 100 and the second chip 110, respectively. The example illustrated in FIG. 4 includes silicon (Si) substrates 403 and 405, wiring layers 404 and 406, negative (n)-type diffusion regions 407, 409, and 410, a positive plus (P+) diffusion region 408, and gate wirings 411 and 417 of the transistors. The example illustrated in FIG. 4 includes signal transmission wirings 412 and 418, micro-pads 413 and 419, vias 414 and 420, a micro-bump 415, and diffusion regions 416 of the transistors.

In the imaging layer 401, the wiring layer 404 is formed on the Si substrate 403. The n-type diffusion region 407 as the photodiode 301 is formed in the Si substrate 403, and the P+ diffusion region 408 is formed on a surface portion (e.g., a boundary portion with the wiring layer 404) of the photodiode 301. A plurality of n+ diffusion regions 409 of the F/D unit and a plurality of n+ diffusion regions 410 of the switching transistor are formed on a surface portion of the Si substrate 403.

In the wiring layer 404, the gate wiring 411 and the signal transmission wiring 412 of each of the transistors are formed in an insulation layer such as silicon dioxide (SiO$_2$). Further, the micro-pad 413 made from copper (Cu) or the like is formed on a surface portion of the wiring layer 404. The transfer transistor 302, the reset transistor 303, the amplification transistor 304, and the selection transistor 305 are each formed from the n+ diffusion region 409, the n+ diffusion region 410, and the gate wiring 411 of the transistor. The via 414 for connecting the n+ diffusion region 410 to the micro-pad 413 is formed in the wiring layer 404.

The wiring layer 406 is formed on the Si substrate 405 in the circuit layer 402. A plurality of diffusion regions 416 of the transistors is formed on a surface portion of the Si substrate 405. In the wiring layer 406, the gate wiring 417 and the signal transmission wiring 418 of each of the transistors are formed in an insulation layer such as SiO$_2$. Further, the micro-pad 419 made from Cu or the like is formed on a surface portion of the wiring layer 406. The various kinds of circuits are formed from, for example, the transistor diffusion regions 416, the gate wirings 417 of the transistors, and the signal transmission wirings 418. The details of the cross section of the circuit do not constitute the essence of the present disclosure, and therefore a description thereof will be omitted herein. The via 420 for connecting the diffusion region 416 and the like to the micro-pad 419 is formed in the wiring layer 406.

FIG. 4 illustrates the configuration example in which the imaging layer 401 and the circuit layer 402 are connected to each other by using the micro-bump as a stack connection terminal. However, they can also be directly connected to each other without the micro-hump.

Figure 5:
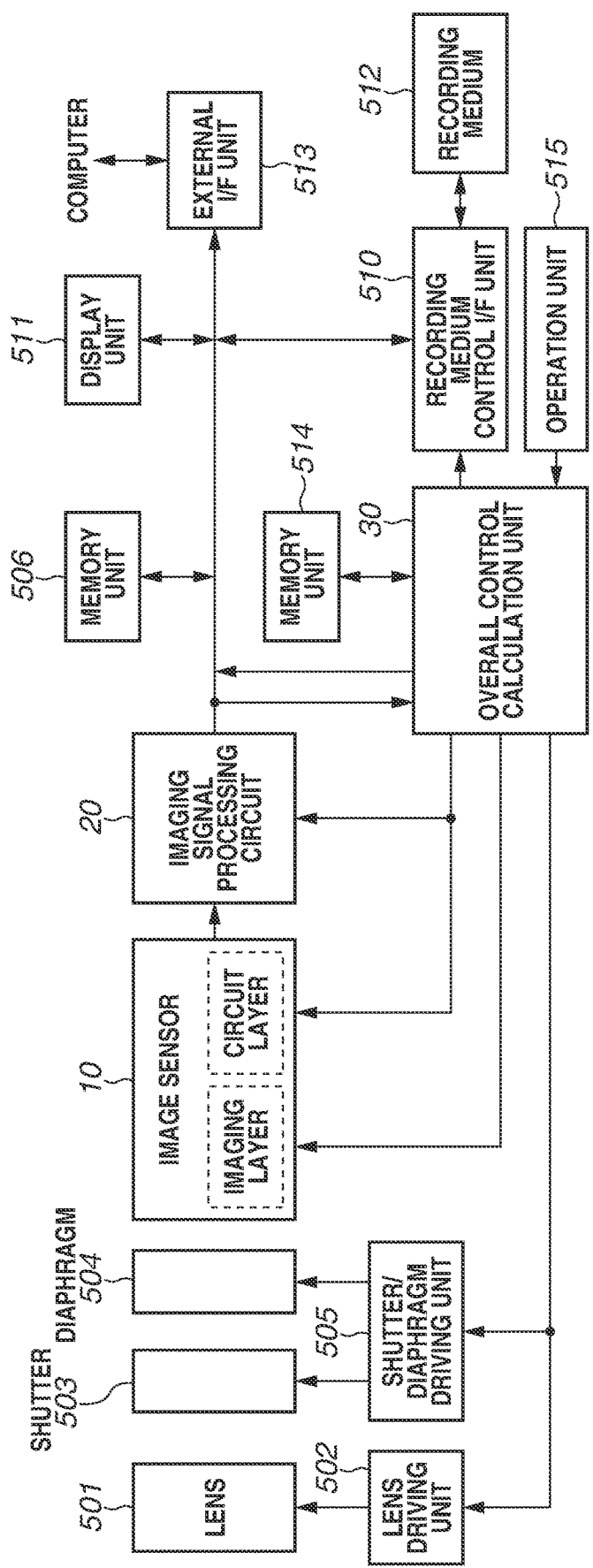
FIG. 5 illustrates a configuration example of an imaging apparatus according to the exemplary embodiment.

FIG. 5 is a block diagram illustrating an imaging apparatus using the image sensor 10 described with reference to FIGS. 1 to 4. The imaging apparatus according to the present exemplary embodiment includes a lens 501, a lens driving unit 502, a mechanical shutter 503, a diaphragm 504, a shutter/diaphragm driving unit 505, the image sensor 10, the imaging signal processing circuit 20, a first memory unit 506, and the overall control calculation unit 30, The imaging apparatus according to the present exemplary embodiment includes a recording medium control interface (I/F) unit 510, a display unit 511, a recording medium 512, an external I/F unit 513, a second memory unit 514, and an operation unit 515.

In the imaging apparatus according to the present exemplary embodiment, after passing through the lens unit 501, a subject image is adjusted so as to have an appropriate light amount by the diaphragm 504 and is formed on an imaging surface of the image sensor 10. The subject image formed on the imaging surface of the image sensor 10 is photoelectrically converted by the photodiode 301 formed in the pixel unit 101. The subject image is further subjected to a gain adjustment and an A/D conversion for the conversion from the analog signal to the digital signal, and is then acquired as an image signal of RED (R), GREEN-red (Gr), GREEN-blue (Gb), and Blue (B). This image signal including R, Gr, Gb, and B is then transmitted to the imaging signal processing circuit 20. The imaging signal processing circuit 20 performs on the image signal, for example, low-pass filter processing or shading processing for reducing noise, various kinds of image signal processing such as white balance processing, and further, various kinds of corrections and a compression of the image data.

The lens unit 501 is controlled by the lens driving unit 502 in terms of driving thereof for focusing, zooming, and the like. The mechanical shutter 503 and the diaphragm 504 are controlled and driven by the shutter/diaphragm driving unit 505. The overall control calculation unit 30 controls the entire imaging apparatus and carries out various kinds of calculations. The first memory unit 506 temporarily stores the image data therein. The recording medium control I/F unit 510 controls recording or reading out the image data in or out of the recording medium 512. The display unit 511, for example, displays the image data. The recording medium 512 is a detachably attachable recording medium such as a semiconductor memory, and is used to record or read out ti image data. The external I/F unit 513 is an interface for communicating with an external computer and the like. The second memory unit 514 stores therein, for example, a result of the calculation carried out by the overall control calculation unit 30. Information regarding a driving condition with respect to driving of the imaging apparatus, which is set by the user on the operation unit 515, is transmitted to the overall control calculation unit 30. The entire imaging apparatus is controlled based on these pieces of information.

Figure 6:
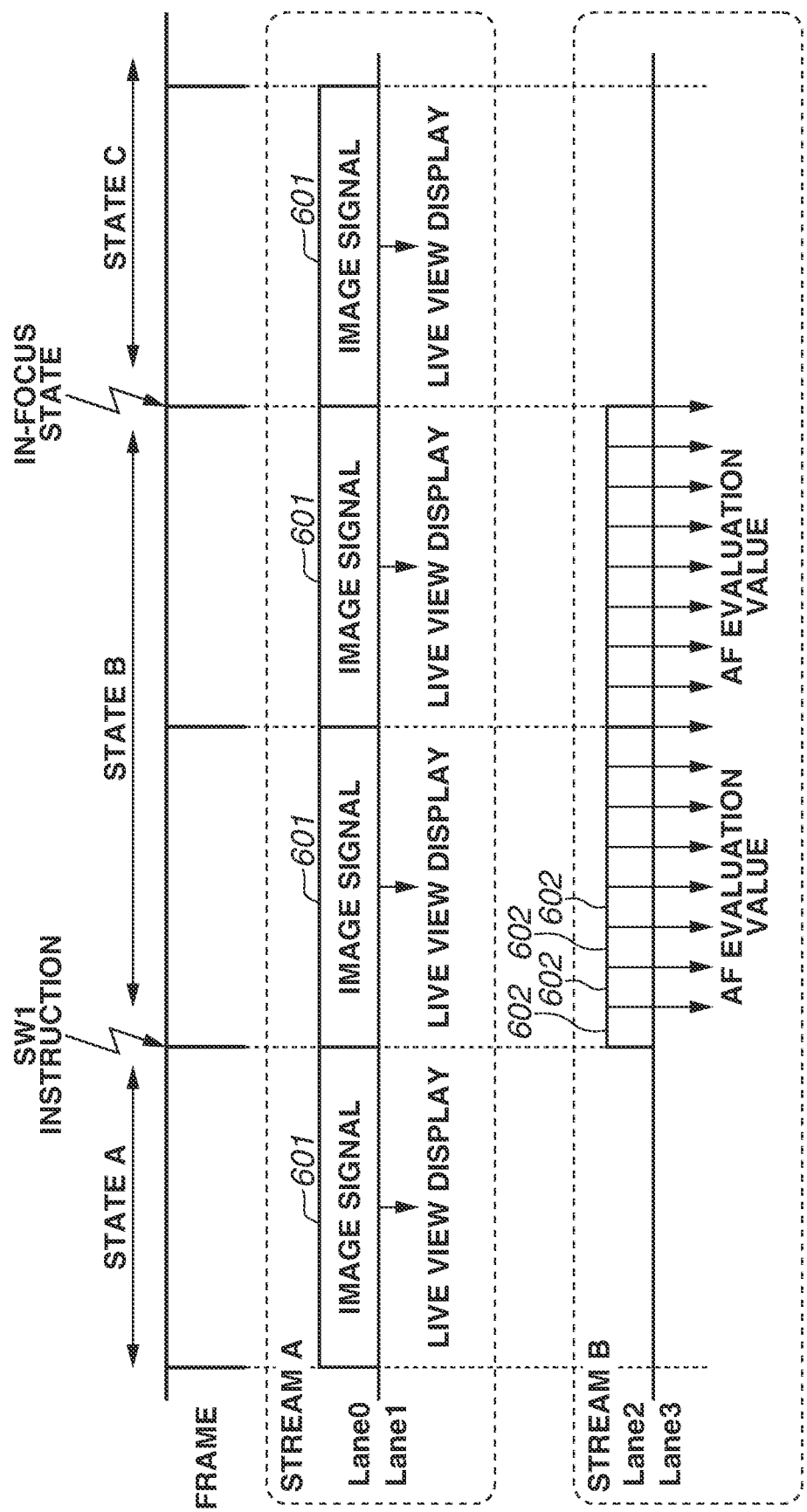
FIG. 6 illustrates a timing chart of an operation example of the imaging apparatus according to the exemplary embodiment.

FIG. 6 is a timing chart illustrating an example of an operation of the imaging apparatus according to the present exemplary embodiment. In the following description, the image sensor 10 and the imaging signal processing circuit 20 are connected to each other via eight lines (e.g., Lanes 0 to 7). An image signal of stream A is transmitted through the first lane 121 having two lines (e.g., Lanes 0 and 1). An image signal of a stream B is transmitted through the second lane 122 having two lines (e.g., Lanes 2 and 3). The image signal of the stream A is used for a live view display. The image signal of the stream B is used for a calculation of an automatic focus (AF) evaluation value regarding AF control.

When the automatic focus is out of operation in a state that the live view is displayed, only the two lanes, only Lane 0 and Lane 1 each serving as the first lane 121 are in operation, and one image signal (e.g., frame data) 601 of the stream A is output from the two lanes (a state A), The output data is an image signal acquired as a result of additive thinning for the live view image.

When the user half presses a release button to issue an instruction for the automatic focus operation, the imaging apparatus also operates with respect to the stream B simultaneously while keeping operating with respect to the stream A of the image sensor 10 (a state B). Thus, the image signal 601 of the stream A is output from the first lane 121, and an image signal 602 of the stream B is output from the second lane 122. An image signal acquired as a result of additive thinning for the calculation of the AF evaluation value is output as the image signal of the stream B. The imaging apparatus can read out the image signal at a high frame rate respect to the stream B. FIG. 6 illustrates the operation when the frame rate of the stream B is eight times as high as that of the stream A as an example.

Figure 7:
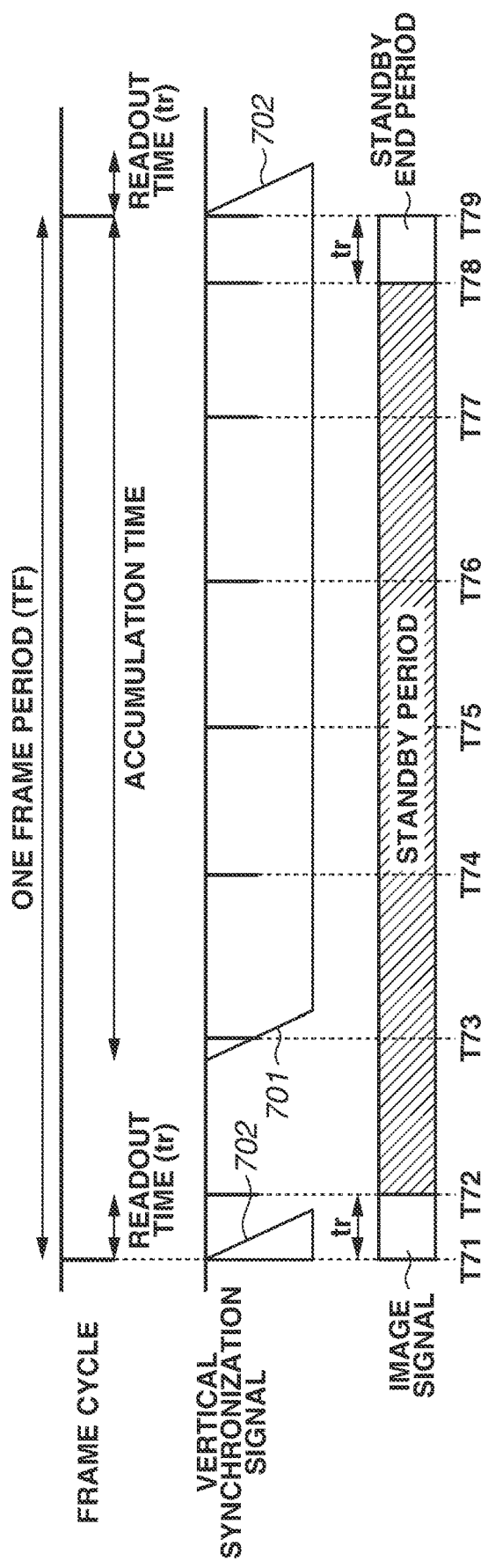
FIG. 7 illustrates an operation example when a plurality of image signals is not output according to the exemplary embodiment.

When the AF evaluation value starts indicating an in-focus state after the lens 501 is driven to be focused via the lens driving unit 502, the imaging apparatus notifies the user that the in-focus state is achieved, stops the operation with respect to the stream B, and return to the state in which only the stream A is in operation (a state C). The image signal of the stream B is not output from the second lane 122, and therefore only the image signal 601 of the stream A from the first lane 121 is output, FIG. 7 illustrates an operation of the image sensor 10 in a state that low power consumption control is ongoing, in which only the image signal of the stream A is read out without operation of stream-B.

The image sensor 10 resets the pixel group that outputs the image signal during a reset section 701. The image sensor 10 then reads out the signal from the pixel group in order row by row and outputs a pixel signal, during a section 702 in which the image signal is read out after an accumrulation time. In the present exemplary embodiment, one frame period is extended, for example, when the charge is accumulated for a long time to conduct an appropriate exposure for the image under a low luminance environment. In the case where the one frame period is extended and one frame time (TF) exceeds a time taken to read out the image signal (tr), the imaging apparatus according to the present exemplary embodiment performs the low power consumption control regarding the image sensor 10, In the low power consumption control regarding the image sensor 10, the imaging apparatus brings the image sensor 10 into a standby state, in which power is supplied to only minimum required circuits.

A driving timing of the image sensor 10 is determined based on a vertical synchronization signal input from the overall control calculation unit 30, In the present example, the vertical synchronization signal is generated eight times during one frame period (TF) in the stream A. In other words, the image signal of the stream A may be read out from the image sensor 10 every time the vertical synchronization signal is input eight times. The readout of the image signal of the stream A is not limited to this example. The imaging apparatus may read out the image signal of the stream A from the image sensor 10 every time the vertical synchronization signal is input any plurality of times.

In response to the first vertical synchronization signal input at time T71, the image sensor 10 starts reading out the image signal of the stream A. At time T72 after the readout time (tr) has passed, at which the readout of the image signal started at time T71 ends, the second vertical synchronization signal is input to the image sensor 10. Upon the input of this second vertical synchronization signal, the image sensor 10 transitions to the standby state (the low power consumption state), in which power is supplied to only the required minimum circuits, Thereafter, the vertical synchronization signal is input at each of times T73 to T77.

The eighth vertical synchronization signal is input to the image sensor 10 at time T78 that is the readout time (tr) earlier than the time the frame period ends. In response to the input of this eighth vertical synchronization signal, the image sensor 10 ends the standby state and prepares for reading out the image signal (a return from the standby state to the normal state). When the vertical synchronization signal is input at time T79 after the readout time (tr) has passed since time T78, the image sensor 10 starts reading out the image signal of the next frame in the stream A.

When the image sensor 10 is driven as illustrated in FIG. 7, the standby period per frame in the stream A is calculated to be (TF−2×tr). In the example illustrated in FIG. 7, the imaging apparatus ends the standby state of the image sensor 10 by inputting the eighth synchronization signal the readout time (tr) earlier than the time the frame period ends. However, the timing for inputting the eighth vertical synchronization signal is not limited to the timing the readout time (tr) earlier than the time the frame period ends. The standby state only has to be cancelled by time T79 at which the readout of the next frame starts.

Figure 8:
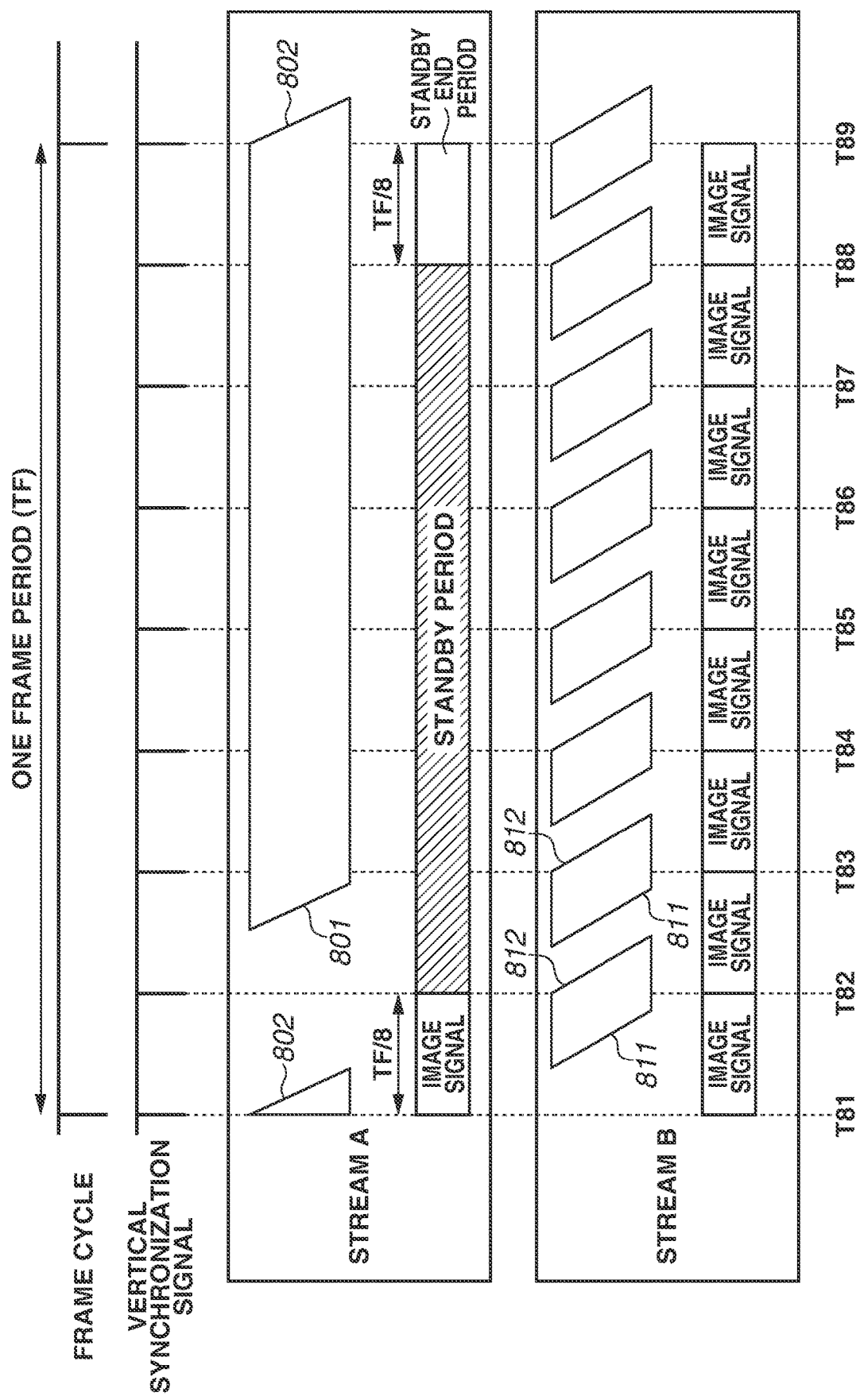
FIG. 8 illustrates an operation example when the plurality of image signals is output according to the exemplary embodiment.

FIG. 8 illustrates an operation of the image sensor 10 in the state that the low power consumption control is ongoing. The imaging apparatus also operates with respect to the stream B, and thus the image signal of the stream A and the image signal of the stream B are simultaneously read out.

In the image sensor 10, a resetting operation of the first pixel group is performed in a reset section 801, with regard to a first pixel group, which outputs the image signal of the stream A. In a section 802 in which the image signal is read out after the accumulation time, the signal is read out in order row by row from the first pixel group, which outputs the image signal of the stream A, and is output as the pixel signal of the stream A. Regarding a second pixel group, which outputs the image signal of the stream B, a resetting operation of the second pixel group is performed in a reset section 811, In a section 812 in which the image signal is read out after the accumulation time, the signal is read out in order row by row from the second pixel group, which outputs the image signal of the stream B, and is output as the pixel signal of the stream B.

A driving timing regarding the stream B is also determined based on the input vertical synchronization signal, similarly to the driving timing regarding the stream A, In the present exemplary embodiment, the image signal of the stream B needs to be read out eight times at equal time intervals during the one frame period (TF) in the stream A. Thus, as illustrated in FIG. 8, the vertical synchronization signal may be input at each of times T81 to T89 every time a predetermined period has passed, which allows the vertical synchronization signal to be input at constant timings. Therefore, the standby period per frame in the stream A is calculated to be (6/8)×TF.

As described above, according to the present exemplary embodiment, the timing of inputting the vertical synchronization signal is controlled so as to increase the standby period, in which the image sensor 10 is kept in the low power consumption state, when the image signal of one stream is output from the image sensor 10. Desirably, the timing of inputting the vertical synchronization signal is controlled so as to maximize the standby period, in which the image sensor 10 is kept in the low power consumption state. When the image signals of the two streams are simultaneously output from the image sensor 10, the timing of inputting the vertical synchronization signal is controlled so as to be synchronized with a readout cycle of the image signal of a stream corresponding to a higher frame rate. This control allows the imaging apparatus capable of simultaneously reading out a plurality of image signals from the image sensor 10 to appropriately read out the image signal and decrease the power consumption based on the image signal to read out. When the image signals of a plurality of streams are simultaneously output from the image sensor 10, the above-described effects can also be achieved by controlling the inputting timing of the vertical synchronization signal so as to synchronize the vertical synchronization signal with a readout cycle of the image signal in a stream with the highest frame rate among those of the plurality of streams.

Figure 9:
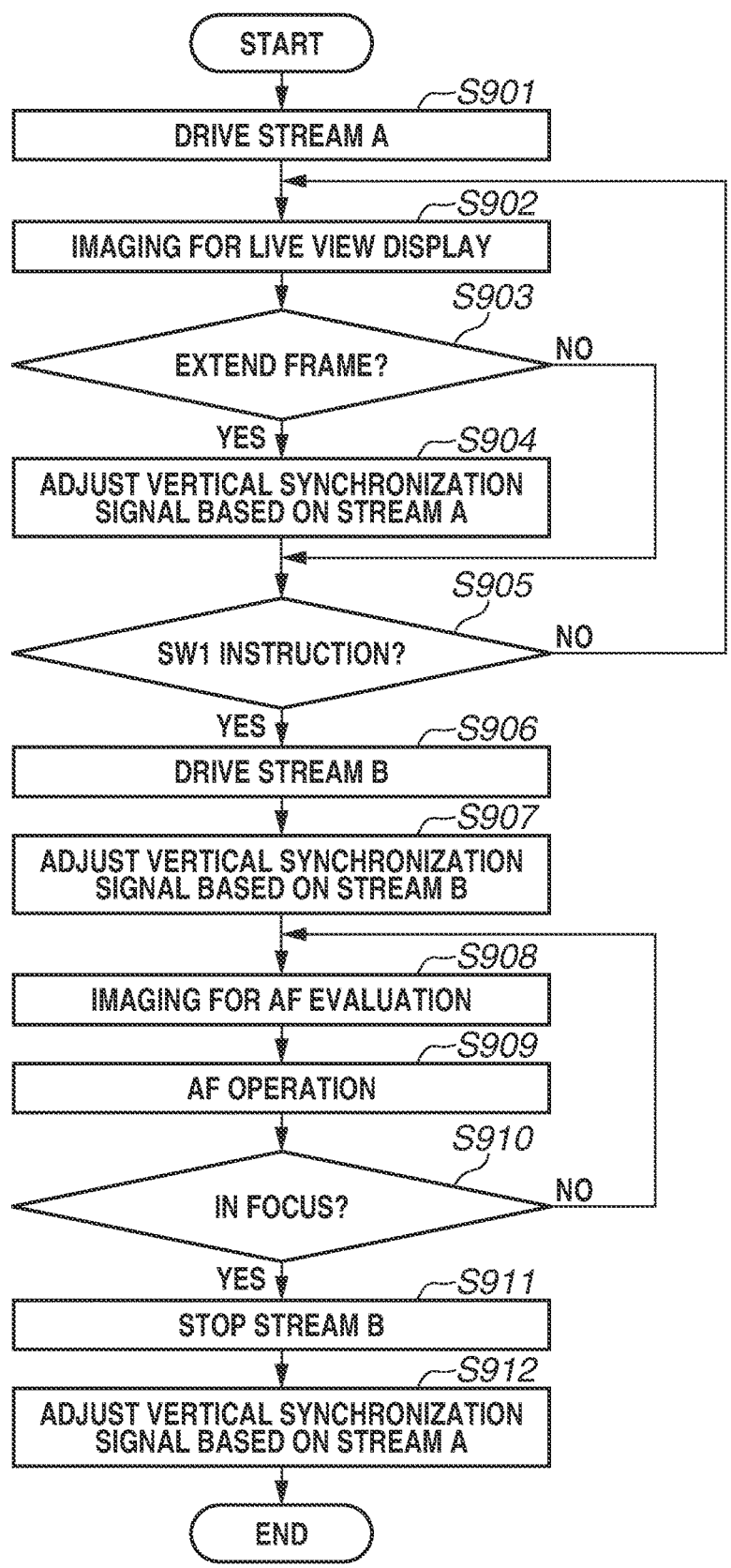
FIG. 9 illustrates a flowchart of an operation example of the imaging apparatus according to the exemplary embodiment.

FIG. 9 is a flowchart illustrating the operation of the imaging apparatus according to the present exemplary embodiment. FIG. 9 illustrates an example when the image signal for the live view display is output as the image signal of the stream A, and the image signal for the calculation of the AF evaluation value regarding the AF control is output as the image signal of the stream B, as described above.

After the imaging apparatus starts up, the live view display starts based on an input of an operation. In step S901, the overall control calculation unit 30 drives the image sensor 10 with respect to only the stream A, In step S902, after the imaging apparatus is driven with respect to the stream A, the image signal acquired as a result of the additive thinning for the live view image (e.g., the image signal for the live view display) is output from the first lane 121 included in the image sensor 10 based on the control by the overall control calculation unit 30. The image signal output from the image sensor 10 is subjected to the predetermined image processing by the imaging signal processing circuit 20, by which the live view image is generated and displayed on the display unit 511.

In step S903, the overall control calculation unit 30 determines whether the frame period should be extended based on the accumulation time for capturing the live view image with the image sensor 10. If the overall control calculation unit 30 determines to extend the frame period (YES in step S903), the processing proceeds to step S904.

In step S904, the overall control calculation unit 30 adjusts the timing of the vertical synchronization signal based on the readout of the image signal regarding the stream A described with reference to FIG. 7, and performs control so as to keep the image sensor 10 in the standby state during the predetermined period in the frame. Then, the processing proceeds to step S905. For example, the overall control calculation unit 30 adjusts the timing of the vertical synchronization signal so as to maximize the period during which the image sensor 10 is kept in the standby state in one frame period in the stream A.

If the overall control calculation unit 30 determines not to extend the frame period in step S903 (NO in step S903), there is no need for control to keep the image sensor 10 in the standby state. Thus, the processing proceeds to step S905 without anything performed.

In step S905, the overall control calculation unit 30 determines whether a request for the automatic focus operation is input in a state of an SW1 instruction, i.e., a state that the release button is half pressed. If the overall control calculation unit 30 determines that no SW1 instruction is issued (NO in step S905), the processing returns to step S902, and the above-described live view imaging operation is repeated. If the overall control calculation unit 30 determines that the SW1 instruction is issued (YES in step S905), the processing proceeds to step S906.

In step S906, the overall control calculation unit 30 also drives the imaging apparatus with respect to the stream B of the image sensor 10, In step S907, the overall control calculation unit 30 adjusts the timing of the vertical synchronization signal to drive the imaging apparatus with respect to the stream B. The timing is based on the readout of the image signal regarding the stream B described with reference to FIG. 8, In other words, the overall control calculation unit 30 adjusts the timing of the vertical synchronization signal so as to synchronize the vertical synchronization signal with the readout cycle of the image signal regarding the stream B, which corresponds to the higher frame rate. At this time, if the frame period in the stream A has been extended and the standby control has been already performed, this adjustment changes the period during which the image sensor 10 is kept in the standby state.

In step S908, the image signal acquired as a result of the additive thinning for the AF evaluation (the image signal for the AF evaluation) is output from the second lane 122 included in the image sensor 10, according to the vertical synchronization signal adjusted in step S907, The stream B has a higher frame rate than that of the stream A, The image signal for the live view display is also output from the first lane 121 included in the image sensor 10 at the predetermined timing based on the control by the overall control calculation unit 30, even during the period in which the image signal for the AF evaluation is output.

In step S909, the overall control calculation unit 30 drives the lens 501 for focusing by controlling the lens driving unit 502. The imaging signal processing circuit 20 calculates the AF evaluation value based on the image signal acquired in step S908, The overall control calculation unit 30 performs focusing based on the calculated AF evaluation value.

In step S910, the overall control calculation unit 30 determines whether the in-focus state is achieved. If the overall control calculation unit 30 determines that the in-focus state is not achieved (NO in step S910), the processing returns to step S908, and the automatic focus operation is repeated until the in-focus state is achieved. If the overall control calculation unit 30 determines that the in-focus state is achieved. (YES in step S910), the processing proceeds to step S911.

In step S911, the overall control calculation unit 30 stops driving the imaging apparatus with respect to the stream B, and stops the output of the image signal from the image sensor 10 for the AF evaluation. In step S912, the overall control calculation unit 30 adjusts the timing of the vertical synchronization signal based on the stream A used in step S904 to return the imaging apparatus to the state before the SW1 instruction is issued, and ends the processing.

As described above, according to the present exemplary embodiment, the imaging apparatus can appropriately switch the standby period of the image sensor 10 between the case when only the image signal of the stream A is output and the case when both the image signal of the stream A and the image signal of the stream B are output. Therefore, the imaging apparatus that simultaneously reads out the plurality of image signals from the image sensor can appropriately read out the image signal and reduce the power consumption based on the image signal to read out.

In the above-described exemplary embodiment, the present disclosure has been described based on the example in which the present disclosure is applied to the digital camera, but the application of the present disclosure is not limited thereto. More specifically, the present disclosure may be applied to every kind of device equipped with an image sensor. For example, the present disclosure can be applied to any apparatus capable of capturing an image, such as a mobile phone terminal and a mobile image viewer, a television equipped with a camera, a digital photo frame, a music player, a game machine, and an electronic book reader.

The present disclosure can also be embodied by processing that supplies a program capable of realizing one or more functions of the above-described exemplary embodiment to a system or an apparatus via a network or a storage medium, and causes one or more processors in a computer of this system or apparatus to read out and execute the program. Further, the present disclosure can also be embodied by a circuit (e.g., an application specific integrated circuit (ASIC)) capable of realizing one or more functions.

Any of the above-described exemplary embodiments merely indicates just one example of how to embody the present disclosure when implementing the present disclosure, and the technical scope of the present disclosure is not be construed limitedly by them. In other words, the present disclosure can be implemented in various manners without departing from the technical idea thereof or the main features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™) a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-009316, filed Jan. 23, 2019, which is hereby incorporated by reference herein in its entirety.

What is claimed is:

1. An imaging apparatus comprising:
   an image sensor including a plurality of pixels and configured to simultaneously read out a first image signal acquired by a first pixel group among the plurality of pixels and a second image signal acquired by a second pixel group among the plurality of pixels; and
   a controller having a processor to execute instructions stored in a memory to perform operations including:
      controlling a vertical synchronization signal to synchronize the vertical synchronization signal with a readout cycle of an image signal corresponding to a high frame rate when the first image signal and the second image signal are simultaneously read out from the image sensor, and
      controlling, in a case where low power consumption control regarding the image sensor is performed, the vertical synchronization signal to increase a period during which the image sensor is kept in a low power consumption state when only the first image signal is read out from the image sensor.

2. The imaging apparatus according to claim 1, wherein controlling includes controlling, in the case where the low power consumption control regarding the image sensor is performed, the vertical synchronization signal to maximize the period during which the image sensor is kept in the low power consumption state when only the first image signal is read out from the image sensor.

3. The imaging apparatus according to claim 1,
   wherein the first image signal is an image signal read out from the image sensor every time the vertical synchronization signal is input a plurality of times, and
   wherein, in a case where one frame period of the first image signal is longer than a time taken to read out the first image signal from the image sensor, controlling includes performing the low power consumption control regarding the image sensor.

4. The imaging apparatus according to claim 1, wherein a frame rate of the second image signal is higher than a frame rate of the first image signal.

5. The imaging apparatus according to claim 1, wherein the second image signal is an image signal read out from the image sensor every time the vertical synchronization signal is input.

6. The imaging apparatus according to claim 1, wherein the first image signal is an image signal used for a live view display, and the second image signal is an image signal used for automatic focus control.

7. A method for controlling an imaging apparatus, wherein the imaging apparatus includes an image sensor having a plurality of pixels and is configured to simultaneously read out a first image signal acquired by a first pixel group among the plurality of pixels and a second image signal acquired by a second pixel group among the plurality of pixels, the method comprising:

controlling a vertical synchronization signal to synchronize the vertical synchronization signal with a readout cycle of an image signal corresponding to a high frame rate when the first image signal and the second image signal are simultaneously read out from the image sensor; and controlling, in a case where low power consumption control regarding the image sensor is performed, the vertical synchronization signal to increase a period during which the image sensor is kept in a low power consumption state when only the first image signal is read out from the image sensor.

8. A computer-readable non-transitory storage medium storing a program for causing a computer to perform a method for controlling an imaging apparatus, wherein the imaging apparatus includes an image sensor having a plurality of pixels and is configured to simultaneously read out a first image signal acquired by a first pixel group among the plurality of pixels and a second image signal acquired by a second pixel group among the plurality of pixels, the method comprising:

controlling a vertical synchronization signal to synchronize the vertical synchronization signal with a readout cycle of an image signal corresponding to a high frame rate when the first image signal and the second image signal are simultaneously read out from the image sensor; and controlling, in a case where low power consumption control regarding the image sensor is performed, the vertical synchronization signal to increase a period during which the image sensor is kept in a low power consumption state when only the first image signal is read out from the image sensor.

* * * * *